Sept. 9, 1969      P. L. RUBEN      3,466,118
FOUR ELEMENT TRIPLET PROJECTION LENS
Filed April 25, 1967

PAUL L. RUBEN
INVENTOR.

BY William F. Delaney Jr.
Robert W. Hampton

ATTORNEYS

United States Patent Office 3,466,118
Patented Sept. 9, 1969

3,466,118
FOUR ELEMENT TRIPLET PROJECTION LENS
Paul L. Ruben, Penfield, N.Y., assignor to Eastman Kodak Company, Rochester, N.Y., a corporation of New Jersey
Filed Apr. 25, 1967, Ser. No. 633,569
Int. Cl. G02b 9/18, 9/34
U.S. Cl. 350—227                                         3 Claims

ABSTRACT OF THE DISCLOSURE

A projection lens comprising three airspaced components, namely a simple positive meniscus front element, a simple negative biconcave middle element, and a compound positive rear component which consists of two cemented elements of opposite refractive power with the cemented surface convex towards the middle element.

---

Figure 1:
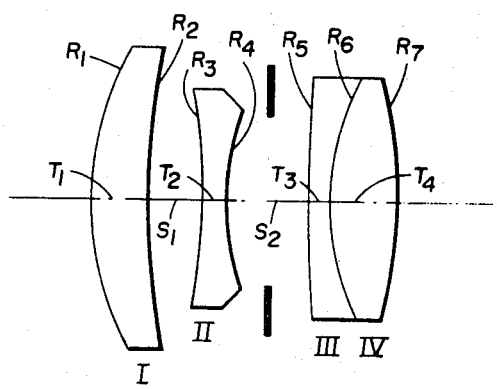

This invention relates to four element, three component projection lenses which are well corrected for all abberations. More specifically, this invention relates to projection lenses comprising three airspaced components, the front component being a simple positive meniscus element, the middle component being a simple negative biconcave element and the rear component being a compound positive component which consists of two cemented elements of opposite refractive power with the cemented surface convex towards the middle element.

The quality required of a projection lens is partially dependent upon its intended use and inversely dependent on the image magnification factor. For example, projection of micro-images usually requires less magnification than does ordinary 35 mm. slide projection, so that lenses having better resolution and aberration corrections are usually used for microfilm projection readers. Still greater lens quality may be required for projection printing magnified copies from microfilm, since the magnification factor is commonly smaller for such copiers than for most microfilm projection readers.

It is an object of this invention to provide well corrected triplet lenses suitable for all types of projection, and particularly for projection of micro-images.

It is another object of this invention to provide four element triplet projection lenses which are well corrected for spherical, comatic, astigmatic and chromatic aberrations, for field-curvature and distortion.

Further objects and advantages will be found in the details of construction disclosed in the accompanying examples and drawings.

These objects are accomplished according to the present invention by four element, three component lenses of the type described above in which the arithmetic means of the refractive indices ($n$) of all glasses in each lens with respect to the D line of the spectrum (587.6 m$\mu$) is greater than 1.68, the refraction indices of the front and rear convergent elements being greater than 1.73. The use of such positive elements reduces spherical aberration both on and off the optical axis and permits the selection of surface curvatures to minimize field curvature.

Lenses constructed according to the present invention are corrected to such a degree that spherical aberration for the C, D and F lines of the spectrum are all less than 1 percent of the effective focal length of the lens. In addition, both sagittal and tangential astigmatism and distortion are also less than approximately 1 percent of the effective focal length of the lens.

Figure 2:
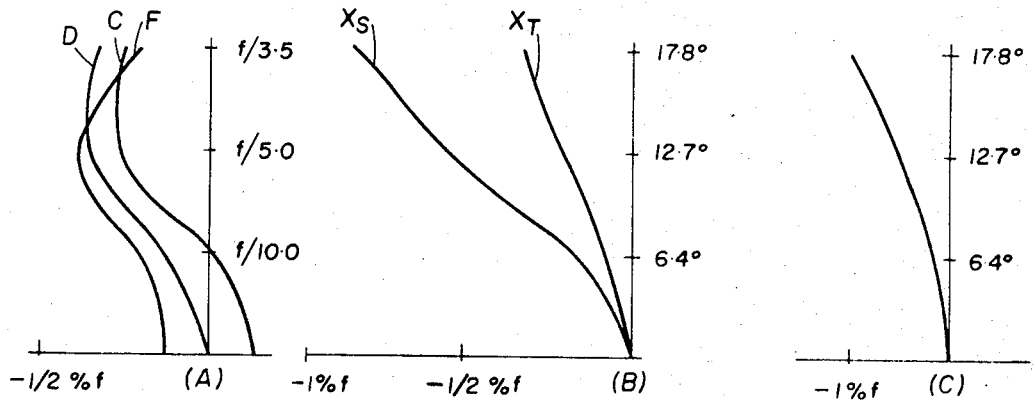

In the drawings:

FIG. 1 is a sectional view of a projection lens embodying the invention with the long conjugate on the left;

FIG. 2 comprises a set of correction curves for the lens disclosed in Example 1 below, showing (a) the spherical aberration curves for the C, D and F lines of the spectrum, (b) the curves for sagittal and tangential astigmatism, and (c) the curve for distortion.

The lens in FIG. 1 comprises three airspaced components, namely a simple positive meniscus front element I, a simple negative biconcave middle element II, and a compound positive rear component which consists of two cemented elements III and IV of opposite refractive power with the cemented surface convex towards the middle element. Element III is convex-concave, and element IV is convex.

Numerical data for constructing three typical projection lenses of focal length $f=100$ according to this invention as outlined above is given in the following examples, in which the lens elements are numbered from front to rear, N is the index of refraction of each lens element for the D line, V is the index of dispersion, and R, T and S refer respectively to the radii of curvature of the lens surfaces, the thicknesses of the lens elements and the airspaces between the elements, numbered by subscript from front to rear.

EXAMPLE 1
[$f=100$; $f/3.5$]

| Lens Elements: | $N_d$ | V | Radii | Thicknesses and spacings |
|---|---|---|---|---|
| I | 1.73 | 51.3 | $R_1=41.6$ | $T_1=8.73$ |
|   |      |      | $R_2=190.0$ | $S_1=7.99$ |
| II | 1.67 | 32.2 | $R_3=-86.7$ | $T_2=3.55$ |
|    |      |      | $R_4=37.3$ |  |
| Stop |  |  |  | $S_2=3.76, 2.96$ |
| III | 1.62 | 36.6 | $R_5=192.8$ | $T_3=2.96$ |
|     |      |      | $R_6=37.3$ |  |
| IV | 1.74 | 44.9 |  | $T_4=9.74$ |
|    |      |      | $R_7=-57.9$ |  |

The lens described in Example 1 is designed to magnify the image by a factor of 21.5, and for a maximum half-field angle of 17.7°. As seen in the correction curves shown in FIG. 2 for this lens, the astigmatisms and distortion are corrected within 1 percent of the effective focal length of the lens and the spherical aberrations for the three color lines C, D and F are all corrected to within ½ percent of the effective focal length.

EXAMPLE 2
[$f=100$; $f/2.8$]

| Lens Elements: | $N_d$ | V | Radii | Thicknesses and spacings |
|---|---|---|---|---|
| I | 1.73 | 51.9 | $R_1=47.6$ | $T_1=9.97$ |
|   |      |      | $R_2=429.7$ | $S_1=8.33$ |
| II | 1.67 | 32.2 | $R_3=-77.4$ | $T_2=3.77$ |
|    |      |      | $R_4=41.0$ |  |
| Stop |  |  |  | $S_2=5.50, 2.52$ |
| III | 1.62 | 36.6 | $R_5=258.6$ | $T_3=3.14$ |
|     |      |      | $R_6=41.3$ |  |
| IV | 1.74 | 44.9 |  | $T_4=11.60$ |
|    |      |      | $R_7=-55.6$ |  |

The above defined lines is particularly designed to magnify the projected image 23 times, and for a maximum half-field angle of approximately 14.5°.

EXAMPLE 3
[$f=100; f/3.0$]

| | $N_d$ | V | Radii | Thicknesses and spacings |
|---|---|---|---|---|
| Lens Elements: | | | | |
| I | 1.73 | 51.3 | $R_1=44.2$ | $T_1=9.80$ |
| | | | $R_2=280.1$ | $S_1=7.79$ |
| II | 1.67 | 32.2 | $R_3=-89.9$ | $T_2=3.29$ |
| | | | $R_4=39.0$ | |
| Stop | | | | $S_2=5.16, 2.77$ |
| III | 1.62 | 36.6 | $R_5=229.2$ | $T_3=3.29$ |
| IV | 1.74 | 44.9 | $R_6=40.4$ | $T_4=11.77$ |
| | | | $R_7=-59.5$ | |

The above lens is designed for magnifying the projected image 25.5 times, and for a maximum half-field angle of approximately 17.7°.

The above two Examples 2 and 3 are corrected for spherical aberration, sagittal and tangential astigmatism and for distortion within approximately 1 percent of the effective focal length of the respective lenses.

Although the invention has been described in considerable detail with reference to certain preferred embodiments thereof, it will be understood that variations and modifications can be effected without departing from the spirit and scope of the invention as described hereinabove.

I claim:

1. A projection lens, having an equivalent focal length $f=100$, and comprising three spaced optically aligned components, the front component being a simple positive meniscus element, the middle component being a simple negative biconcave element, and the rear component being a compound positive component consisting of two cemented elements of opposite refractive power, the cemented surface of said rear component being convex towards the middle component, the lens elements having susbstantially the following characteristics and spatial relations in which the lens elements are numbered from the front, N is the index of refraction for the D line, V is the index of dispersion and R, T and S refer respectively to the radii of curvature of the lens surfaces, the axial thicknesses of the lens elements, and the axial spacings between the lens elements, numbered by subscript from front to rear:

| | $N_d$ | V | Radii | Thickness and Spacings |
|---|---|---|---|---|
| Lens Elements: | | | | |
| I | 1.73 | 51.3 | $R_1=41.6$ | $T_1=8.73$ |
| | | | $R_2=190.0$ | $S_1=7.99$ |
| II | 1.67 | 32.2 | $R_3=-86.7$ | $T_2=3.55$ |
| | | | $R_4=37.3$ | $S_2=6.72$ |
| III | 1.62 | 36.6 | $R_5=192.8$ | $T_3=2.96$ |
| IV | 1.74 | 44.9 | $R_6=37.3$ | $T_4=9.74$ |
| | | | $R_7=57.9$ | |

2. A projection lens, having an equivalent focal length $f=100$, and comprising three spaced optically aligned components, the front component being a simple positive meniscus element, the middle components being a simple negative biconcave element, and the rear component being a compound positive component consisting of two cemented elements of opposite refractive power, the cemented surface of said rear component being convex towards the middle component, the lens elements having substantially the following characteristics and spatial relations in which the lens elements are numbered from the front, N is the index of refraction for the D line, V is the index of dispersion and R, T and S refer respectively to the radii of curvature of the lens surfaces, the axial thicknesses of the lens elemenas, and the axial spacings between the lens elements, numbered by subscript from front to rear:

| | $N_d$ | V | Radii | Thickness and Spacings |
|---|---|---|---|---|
| Lens Elements: | | | | |
| I | 1.73 | 51.0 | $R_1=47.6$ | $T_1=9.97$ |
| | | | $R_2=439.7$ | $S_1=8.33$ |
| II | 1.67 | 32.2 | $R_3=-77.4$ | $T_2=3.77$ |
| | | | $R_4=41.0$ | $S_2=8.02$ |
| III | 1.62 | 36.6 | $R_5=258.6$ | $T_3=3.14$ |
| IV | 1.74 | 44.9 | $R_6=41.3$ | $T_4=11.60$ |
| | | | $R_7=-55.6$ | |

3. A projection lens, having an equivalent focal length $f=100$, and comprising three spaced optically aligned components, the front component being a simple positive meniscus element, the middle component being a simple negative biconcave element, and the rear component being a compound positive component consisting of two cemented elements of opposite refractive power, the cemented surface of said rear component being convex towards the middle component, the lens elements having substantially the following characteristics and spatial relations in which the lens elements are numbered from the front, N is the index of refraction for the D lines, V is the index of dispersion and R, T and S refer respectively to the radii of curvature of the lens surfaces, the axial thicknesses of the lens elements, and the axial spacings between the lens elements, numbered by subscript from front to rear:

| | $N_d$ | V | Radii | Thickness and Spacings |
|---|---|---|---|---|
| Lens Elements: | | | | |
| I | 1.73 | 51.3 | $R_1=44.2$ | $T_1=9.80$ |
| | | | $R_2=280.1$ | $S_1=7.79$ |
| II | 1.67 | 32.2 | $R_3=-89.9$ | $T_2=3.29$ |
| | | | $R_4=39.0$ | $S_2=7.93$ |
| III | 1.62 | 36.6 | $R_5=229.2$ | $T_3=3.29$ |
| IV | 1.74 | 44.9 | $R_6=40.4$ | $T_4=11.77$ |
| | | | $R_7=-59.5$ | |

References Cited

UNITED STATES PATENTS 2,764,063  9/1956  Lange _____ 350—227

FOREIGN PATENTS 1,437,558  3/1966  France.

DAVID SCHONBERG, Primary Examiner

RONALD J. STERN, Assistant Examiner

U.S. Cl. X.R.

350—209